United States Patent [19]

Müller et al.

[11] 4,370,904

[45] Feb. 1, 1983

[54] METHOD AND APPARATUS FOR CONTROLLING THE TORQUE OF AN INTERNAL COMBUSTION ENGINE

[75] Inventors: Alfred Müller, Leonberg; Manfred Schwab, Gerlingen; Walter Stroh, Cleebronn, all of Fed. Rep. of Germany

[73] Assignee: Robert Bosch GmbH, Stuttgart, Fed. Rep. of Germany

[21] Appl. No.: 261,569

[22] Filed: May 7, 1981

[30] Foreign Application Priority Data

May 10, 1980 [DE] Fed. Rep. of Germany ....... 3018033

[51] Int. Cl.³ .............................................. B60K 41/08
[52] U.S. Cl. ......................................... 74/858; 74/866
[58] Field of Search ............... 123/325, 329, 423, 493; 74/858, 866, 872

[56] References Cited

U.S. PATENT DOCUMENTS

| | | | |
|---|---|---|---|
| 3,742,920 | 7/1973 | Black | 123/493 |
| 3,794,003 | 2/1974 | Reddy | 123/325 X |
| 4,191,137 | 3/1980 | Williams et al. | 123/493 X |
| 4,200,007 | 4/1980 | Espenschied et al. | 74/872 X |
| 4,228,700 | 10/1980 | Espenschied et al. | 74/866 |
| 4,257,377 | 3/1981 | Kinugawa et al. | 123/493 X |
| 4,259,723 | 3/1981 | Fujisawa et al. | 123/493 X |
| 4,266,447 | 5/1981 | Heess et al. | 74/858 |

*Primary Examiner*—Tony M. Argenbright
*Attorney, Agent, or Firm*—Frishauf, Holtz, Goodman & Woodward

[57] ABSTRACT

The signal initiating a reduction of engine torque during gear shift is derived from a monitoring of the engine speed. Specifically, the decrease in torque is initiated when engine deceleration, as determined by the negative speed gradient, exceeds a predetermined value. The torque decrease can, as preferred, take place only if a gear shift occurs, or it may take place independent of gear shift in which case high decelerations caused, for example, by rapid application of the brakes, also cause the decrease.

8 Claims, 1 Drawing Figure

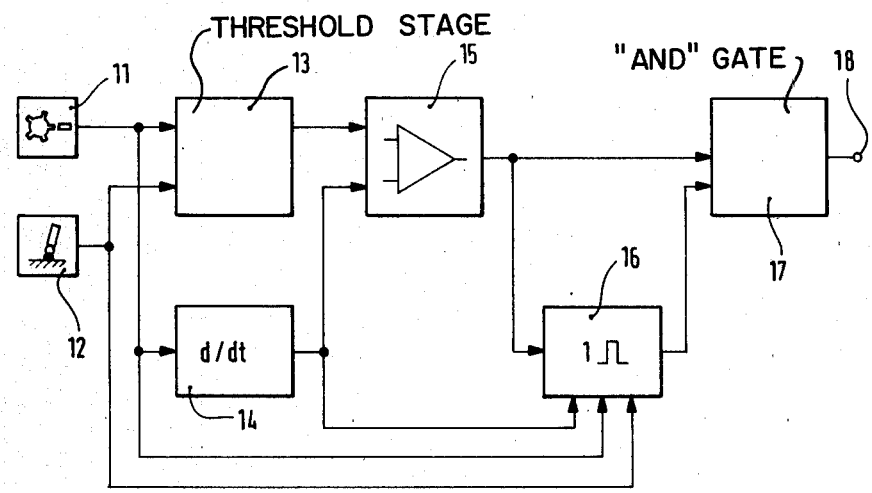

METHOD AND APPARATUS FOR CONTROLLING THE TORQUE OF AN INTERNAL COMBUSTION ENGINE

U.S. application Ser. No. 080,005, filed Sept. 28, 1979, now U.S. Pat. No. 4,355,550.

The present application relates to methods and apparatus for controlling the torque of an internal combustion engine during a gear-shifting operation. In particular, it relates to apparatus in which the torque is decreased by retiming of the ignition and/or decrease of the fuel supply.

BACKGROUND OF THE INVENTION

It is well known that in motor vehicles with internal combustion engines which are coupled to an automatic transmission, the jolt during shifting of the transmission can be decreased substantially by decreasing the engine torque.

For example, in British Pat. No. 929 621 apparatus is described in which the shift signals for up-shift operate a monostable multivibrator which causes a temporary closing of the throttle valve.

In the system shown the DE-PS No. 10 80 415, the control apparatus for the automatic transmission consists of a mechanically operable switch which is closed when a control shaft is in a particular position. When the switch is closed, it operates a relay and a solenoid which in turn control the linkages to the throttle valve of the engine or to the ignition system.

In the apparatus of DE-OS No. 14 80 177, the shift command electromagnetically activates a pawl which blocks the fuel supply during the shift until the synchronous operation of the gearing has been reestablished.

Reduction of engine speed during gear shift by a retiming of the ignition is illustrated in DE-AS No. 16 26 427. A delay circuit is provided which, upon initiation of the shift, delays the spark generation.

In the apparatus described in French Pat. No. 1 524 354, a timing unit is provided which interrupts the fuel supply for a predetermined time interval during gear shift.

Similarly, the system illustrated in DE-AS No. 21 09 620 causes an interruption of the fuel injection together with activation of the solenoid causing the gear change, but delayed relative thereto.

DE-AS No. 21 63 979 teaches the system wherein the up-shift command signal of the automatic transmission is differentiated, the differentiated up-shift signal being applied to a computer which in turn decreases the width of the injection pulses during the gear shift.

All of the above-described systems for reducing a motor torque during gear shift have the common disadvantage that the time at which the reduction of torque is to take place depends upon the time that the shift command is initiated and, therefore, means have to be provided which signal the initiation of this shift command.

THE INVENTION

It is an object of the present invention to allow the correct timing of the reduction of the motor torque during a shift operation without, however, requiring the apparatus for indicating the initiation of the shift command. The reduction of the motor torque in accordance with the present invention takes place when the need therefor is indicated by operating parameters of the internal combustion engine. Specifically, the torque is decreased when the engine deceleration (rate of change with respect to time of engine speed) exceeds a predetermined maximum deceleration. This type of torque reduction equipment can thus be added to existing engines without requiring any tampering with the transmission or its control.

BRIEF DESCRIPTION OF THE DRAWING

The single FIGURE is a block diagram illustrating a preferred embodiment of the present invention.

DESCRIPTION OF THE PREFERRED EMBODIMENT

Today's automatic transmissions generally operate by activation or release of different friction elements which determine the particular gear ratio. The friction elements themselves, as well as the variation with respect to time of the operating pressure applied thereto is so designed that the whole range of load from coasting through zero load up to full load shifting without torque transmission interruption is covered. The greatest operating pressure is applied and therefore the highest loading of the friction elements takes place during an up-shift under relatively high load. If a maximum allowable slipping time is specified for the friction elements, a determined average operating pressure will be needed for transmission of the required torque.

This means that the elements in the hydraulic or electrohydraulic control of the transmission are designed on the basis of the requirements for torque transmission under full load.

In accordance with the present invention, a less than average operating pressure is supplied even for this type of operation. It is then, however, required that the motor torque is also decreased, since otherwise the friction elements would rub for too long a time and therefore finally be destroyed. If the motor torque is decreased, the operating pressure for the friction elements must of course be only that which is required to transmit the lesser torque, i.e. a torque which is substantially less than the maximum transmission input torque. This increases the comfort of the passengers of the vehicle, while at the same time increasing the life of the friction elements.

The decrease of the motor torque takes place by a well-known method, for example, the ignition angle of an Otto motor is shifted towards a late timing, or the amount of fuel injected for a diesel motor is reduced for a short time. The motor speed is monitored in order to indicate when the operating conditions correspond to gear shift with torque transmission under full load. Specifically, the decrease in motor torque is initiated when monitoring of engine speed indicates that the negative rate of change of that speed exceeds a predetermined maximum deceleration value.

Referring now to the FIGURE, a motor speed signal is furnished by a sensor 11 while a signal indicative of engine load is furnished by a sensor 12. The latter is generally either the foot pedal or the throttle valve. The signals from the two sensors are applied to a stage 13 which generates a signal corresponding to the maximum allowable deceleration.

The input of differentiating stage 14 is connected to the output of sensor 11. The outputs of stage 13 and differentiating stage 14 are connected to respective inputs of a comparator 15 whose output is in turn connected to one input of an AND-gate 17. A further input of AND-gate 17 is connected to the output of a monostable multivibrator 16. The timing input of monostable multivibrator 16 is connected to the output of stage 15, respective control inputs being connected to sensor 11, sensor 12 and differentiating stage 14.

The above-described apparatus operates as follows: the speed signal furnished by sensor 11 is differentiated with respect to time in differentiator stage 14. If the positive part of the signal at the output of differentiator stage 14 is suppressed, the remaining signal at this output corresponds to the deceleration of the engine. This deceleration signal is compared to a value signifying the predetermined maximum deceleration computed in stage 13. Specifically, a value is preset in stage 13 which is selected so that, for full load without gear shift, no operating condition can occur in which a higher negative engine speed gradient would be reached. For example, a maximum engine speed gradient of 1240 U/min.33 sec. would be set for a vehicle having a weight of 1500 kg which is driving up a 30% slope in first gear under full load. This predetermined maximum engine speed gradient may also be varied as a function of engine speed and load.

The time interval during which the engine torque is decreased is determined by the time interval during which monostable multivibrator 16, which is set by the rising edge of the output signal of comparator 16, remains in the astable stage. In accordance with the invention, the time during which monostable multivibrator 16 remains in the astable state changes in dependence upon engine speed, load and engine speed gradient. The signal at the output of AND-gate 17, namely the signal at the terminal 18, is herein referred to as a torque reducing signal. In the presence of this signal, the engine torque is reduced as described above.

Finally, AND-gate 17 could be provided with a third input connected to a gear control stage 10. Specifically, the third input of AND-gate 17 would be connected to the shift control signal output of stage 10, so that AND-gate 17 would become conductive only during a gear shift. Thus, there would be no reduction in motor torque in the absence of the gear shift. Without this third input, the present invention would be operative in those cases in which the engaging deceleration is excessive even in the absence of the gear shift, for example during strong braking. A decrease in motor torque may be very advantgeous under these conditions also.

Although the invention has been described with reference to a specific embodiment, it is not to be limited thereto since various modifications and changes will readily occur to one skilled in the art and are intended to be encompassed by the following claims.

I claim:

1. In an internal combustion engine having an automatic transmission and means for decreasing the output torque of said engine in response to a torque reducing signal;
    apparatus for generating said torque reducing signal whenever a gear-shifting operation of said automatic transmission takes place, comprising
    first means (11,14) for generating a deceleration signal corresponding to the rate of decreases with respect to time of the speed of said internal combustion engine; and
    second means (11,12,13) for generating a reference deceleration signal value representative of a threshold below which the value of deceleration is too low to correspond to the occurrence or imminence of a gear-shifting operation of said transmission;
    third means (15,16,17) connected to said first and second means for furnishing said torque reducing signal when said deceleration signal is indicative of an engine deceleration exceeding said reference deceleration signal value.

2. Apparatus as set forth in claim 1, wherein said second means comprises timing means (16) for limiting said furnishing of said torque reducing signal to a predetermined time period following generation of said deceleration signal.

3. Apparatus as set forth in claim 2, wherein said predetermined time period varies as a function of engine speed.

4. Apparatus as set forth in claim 2, wherein said predetermined time invertal varies as a function of engine load.

5. Apparatus as set forth in claim 2, wherein said predetermined time interval varies as a function of engine deceleration.

6. Method for generating a torque reducing signal for activating torque reducing apparatus in an internal combustion engine of a vehicle equipped with an automatic transmission whenever a gear-shifting operation of said automatic transmission takes place, comprising the steps of:
    generating a deceleration signal corresponding to the rate of change with respect to time of then-present engine speed; and
    generating, in response to engine speed and engine load signals, a deceleration reference signal value representative of a threshold below which the value of deceleration is too low to correspond to the occurrence or imminence of a gear-shifting operation of said transmission, and
    generating said torque reducing signal when said deceleration signal exceeds said deceleration reference signal value.

7. Method as set forth in claim 6, further comprising the step of interrupting said torque reducing signal after a predetermined time interval.

8. A method as set forth in claim 7, wherein said predetermined time interval varies in dependence upon a selected operation parameter of said engine.

* * * * *